E. KAYE.
METHOD OF MANUFACTURING BUILDING BLOCKS OR BRICKS AND GLASS FACINGS THEREFOR.
APPLICATION FILED JUNE 5, 1908.
915,609.
Patented Mar. 16, 1909.
2 SHEETS—SHEET 1.
Fig. 1.
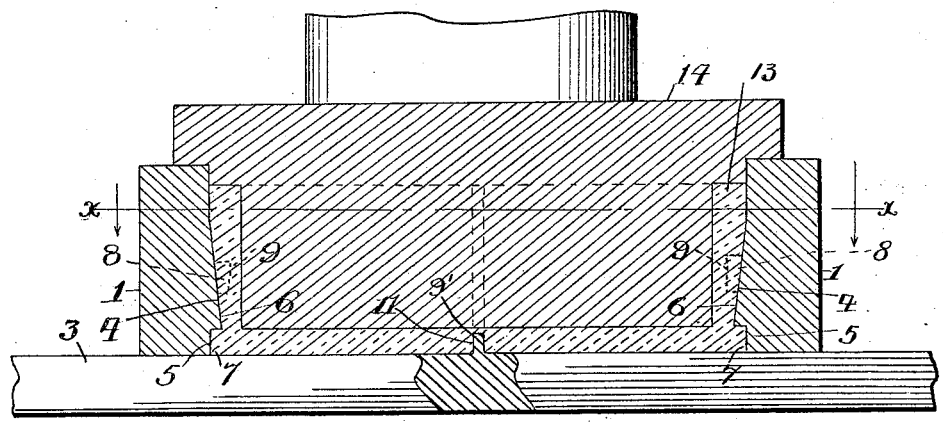
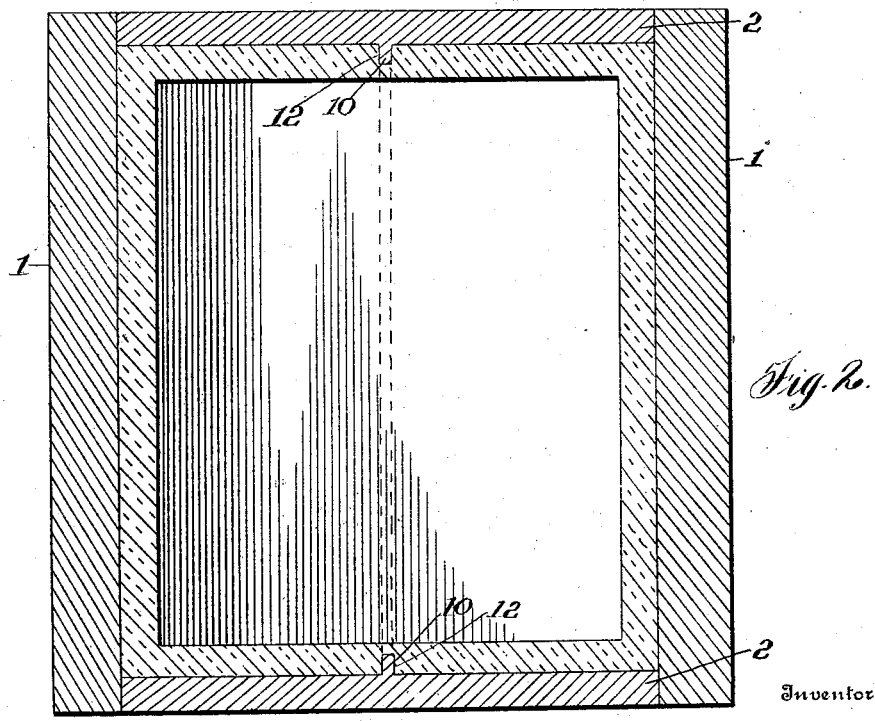
Fig. 2.
Witnesses
F. G. Campbell
I. P. Hines
Inventor
Edward Kaye
By Connolly Bros.
Attorneys E. KAYE.
METHOD OF MANUFACTURING BUILDING BLOCKS OR BRICKS AND GLASS FACINGS THEREFOR.
APPLICATION FILED JUNE 5, 1908.
915,609.
Patented Mar. 16, 1909.
2 SHEETS—SHEET 2.
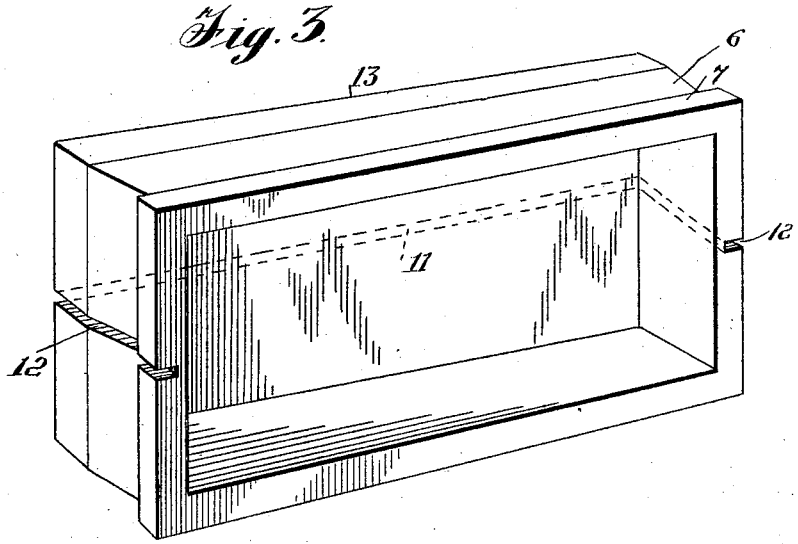
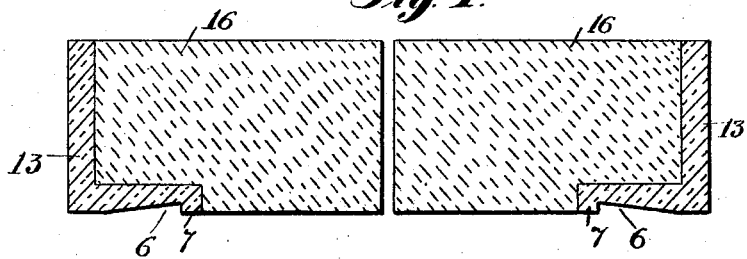
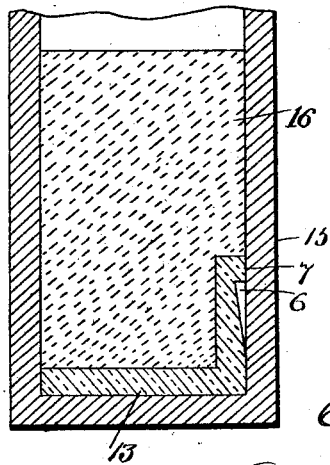
Witnesses
Inventor
Edward Kaye
By Connolly Bros.
Attorneys

UNITED STATES PATENT OFFICE.

EDWARD KAYE, OF MONACA, PENNSYLVANIA.

METHOD OF MANUFACTURING BUILDING BLOCKS OR BRICKS AND GLASS FACINGS THEREFOR.

No. 915,609.  Specification of Letters Patent.  Patented March 16, 1909.

Application filed June 5, 1908. Serial No. 436,941.

*To all whom it may concern:*

Be it known that I, EDWARD KAYE, a citizen of the United States, residing at Monaca, in the county of Beaver and State of Pennsylvania, have invented certain new and useful Improvements in Methods of Manufacturing Building Blocks or Bricks and Glass Facings Therefor, of which the following is a specification.

This invention has relation to methods of manufacturing building blocks or bricks and glass facings therefor and has for its object a novel method of manufacture whereby time, labor, material and expense are saved and a plurality of novel and useful glass facings are simultaneously produced by a single pressing or blowing operation, which facings are ultimately employed as component parts of a plurality of building blocks or bricks.

In carrying my method into effect I press, or blow, in a suitable mold, a mass of glass to rectangular box-like form, open on one side and then separate this mass into two halves, each of which constitutes a facing for a building block or brick, each such facing having a front wall, a bottom, and two end walls. The facings so produced are ultimately provided with a filling and backing of cement, concrete, ceramic or other suitable substance, so that each facing will constitute a component part of a complete building block or brick.

In pressing the facings, I preferably form a "breaking line" therein by forming a groove along the center of the bottom and the end walls of the box-like mass during the pressing operation as such "breaking line" greatly facilitates the separation of the mass into the two halves which constitute the two facings, but it will be understood that other well known means may be employed for facilitating the separation of the mass into the desired parts, such, for instance, as by cutting the mass along the desired line by means of a diamond.

I have shown in the accompanying drawing sufficient apparatus to enable others skilled in the art to practice my improved method and have also shown the pressed or molded glass mass before it has been separated into two facings and have also shown two building blocks or bricks of which the facings constitute component parts and in the drawings: Figure 1 is a vertical sectional view of a mold with the completed facing therein. Fig. 2 is a horizontal sectional view of the mold, with the facing therein and the plunger omitted, on line $x$—$x$ of Fig. 1. Fig. 3 is a perspective view of the two pressed or molded facings before being separated. Fig. 4 is a vertical transverse section of two building blocks of which the pressed or molded facings shown in Fig. 3 constitute component parts. Fig. 5 is a sectional view of the mold for forming the cement backing and filling in the facing.

The mold for forming the mass of glass to the form required to make two facings simultaneously at a single pressing operation may be of any suitable form, that which I have illustrated being composed of the sides 1 and the ends 2 and the bottom plate 3. The sides 1 and the ends 2 are inwardly inclined on their inner surfaces from near their upper edges to near their lower edges as shown at 4 and are cut away at the lower end of the inclined surfaces, as shown at 5 so that the mass of glass formed in the mold will have a groove 6 formed in it adjacent to that portion which is at the bottom of the mold, this groove being preferably of triangular form and leaving a flange 7 all around the mass of glass, the groove serving, in the completed building block or brick, to provide a recess for the reception of the mortar or cement in which the building blocks are laid in constructing walls, floors or facings. If desired the mold may also be provided with projections designated 8 which form recesses 9 at the bottom of groove 6, these recesses providing additional binding means for the mortar or cement in which the building blocks or bricks are laid.

The bottom plate 3 of the mold is formed with a horizontal rib 9' and the ends 2 of the mold are formed with vertical ribs 10, these ribs serving to form a deep groove 11 in the mass of glass at that portion which is at the bottom of the mold and which subsequently becomes the fronts of the two facings and similar groove 12 on the two ends of the mass of glass, the grooves on the end and the grooves on the bottom constituting a "breaking line" by reason of the diminution of thickness of the walls of the mass of glass and facilitating the separation of the latter to form two complete facings as will be hereinafter described.

The mass of glass, designated 13, is pressed in the mold by means of a plunger 14 of appropriate form and when completed is of the form shown in Fig. 3, that is of hollow, rectangular, box-like form, with one side open and with a flange 7 around the edges of the open side, a groove 6 adjacent said flange and a "breaking line" along both ends and along the closed side. The box-like article shown in Fig. 3, and which may properly be termed a blank, should be annealed after having been removed from the mold and is thereafter separated into two halves by breaking it apart along the "breaking line" and the two halves of the blank then constitute two complete facings for two building blocks or bricks.

A suitable manner of completing the building blocks or bricks is illustrated in Fig. 5, in which one of the facings produced in the manner above described is shown in position in a mold 15 with that part of the facing which is to form the front of the brick at the bottom of the mold. After the facing has been placed in the mold 15, the latter is filled to the required depth with cement, concrete or other suitable material 16, which is, if necessary, tamped, pressed or otherwise properly compacted and then allowed to dry, the cement or other material adhering to the facing and the whole constituting when completed in the manner described a complete building block or brick with a glass facing and a cement or other suitable backing. The other half of the blank is similarly provided with a filling and backing and thus two complete building blocks or bricks, each having a glass facing, are formed from a single blank by providing a suitable backing and filling for each half of the blank, two such complete blocks or bricks being shown in Fig. 4 of the drawing.

While I have described the complete building blocks or bricks as being formed by packing a primarily plastic material into and adjacent the glass facing so as to form a self adherent filling and backing piece for the glass facing, it is obvious that the filling and backing piece could be formed separate from the facing and then, after it had hardened, could be cemented or otherwise attached to the facing, or the filling and backing can be made of wood, stone or other solid material cut or otherwise formed to the desired shape and then connected or otherwise suitably attached to the facing.

I claim:

1. The method of making building blocks or bricks consisting in forming a blank comprising a plurality of connected facings, then dividing the blank into a plurality of sections each constituting a complete facing, then applying to each facing while the facings are in hardened condition a suitable unheated filling and thereby forming a plurality of completed building blocks or bricks.

2. The method of making glass-faced building blocks or bricks consisting in forming a blank comprising a plurality of connected facings, then dividing the blank into sections, each constituting a facing, then applying to each facing a filling of cold plastic material of suitable form and allowing the latter to dry, thereby completing a plurality of building blocks.

In testimony whereof I have affixed my signature, in the presence of two witnesses.

EDWARD KAYE.

Witnesses:
HARRY C. FRY, Jr.,
JOHN MOULDER.